United States Patent [19]

Boyko et al.

[11] Patent Number: 5,660,237
[45] Date of Patent: Aug. 26, 1997

[54] CASTERING WHEEL ASSEMBLIES FOR AN AUTO-FOLD AGRICULTURAL DRAWBAR

[75] Inventors: Stanley Boyko, Wakaw; Garry Kupchinski; Darryl Kerr, both of St. Brieux, all of Canada

[73] Assignee: F. P. Bourgault Industries Air Seeder Division Ltd., Saskatchewan, Canada

[21] Appl. No.: 361,766

[22] Filed: Dec. 22, 1994

[30] Foreign Application Priority Data

Oct. 20, 1994 [CA] Canada ................................. 2133941

[51] Int. Cl.$^6$ ................................................. A01B 49/00
[52] U.S. Cl. ........................... 172/311; 172/456; 172/481
[58] Field of Search ............................. 172/311, 131, 172/413, 462, 779, 456, 310, 298, 392, 480, 481; 280/656

[56] References Cited

U.S. PATENT DOCUMENTS

| | | | |
|---|---|---|---|
| 3,521,906 | 7/1970 | Parker | 172/311 |
| 3,523,699 | 8/1970 | Sinkule et al. | 172/311 |
| 3,548,954 | 12/1970 | Lindemann et al. | 172/311 |
| 3,552,773 | 1/1971 | Purrer et al. | 172/311 X |
| 3,791,673 | 2/1974 | Hornung | 172/311 |
| 3,878,901 | 4/1975 | Robertson, Sr. | 172/413 |
| 3,880,240 | 4/1975 | Jarrett | 172/131 |
| 3,960,221 | 6/1976 | Blair et al. | 172/311 |
| 4,008,833 | 2/1977 | Gandrud et al. | 172/311 X |
| 4,121,852 | 10/1978 | Quanbeck | 172/311 |
| 4,126,187 | 11/1978 | Schreiner et al. | 172/311 |
| 4,275,670 | 6/1981 | Dreyer | 172/462 X |
| 4,300,640 | 11/1981 | Baxter et al. | 172/311 |
| 4,301,873 | 11/1981 | Baxter | 172/311 |
| 4,567,689 | 2/1986 | Lemons | 172/6 X |
| 5,029,757 | 7/1991 | Bourgault et al. | 239/167 |

Primary Examiner—Terry Lee Melius
Assistant Examiner—Victor Batson
Attorney, Agent, or Firm—St. Onge Steward Johnston & Reens LLC

[57] ABSTRACT

An agricultural drawbar adapted to be pulled by a power source and used for farming operations such as spraying or harrowing, is equipped with right and left wing booms which are adapted to be folded or unfolded from the transport to operating positions. To enable the drawbar to move more quickly and easily from one position to another, lockable inner caster wheels are attached to a tensioning/control assembly which is attached to the cart. During the folding process the inner lockable caster wheels are progressively turned as the wings move to the folded transport position, thus easing the implement quickly into the transport position without skidding or binding of the wheels. Furthermore, a semi-lockable outer caster wheel is adapted to rotate inwardly to a toe-out position to facilitate the unfolding of the drawbar when the drawbar is pushed rearwardly.

10 Claims, 10 Drawing Sheets

FIG. 6A

CASTERING WHEEL ASSEMBLIES FOR AN AUTO-FOLD AGRICULTURAL DRAWBAR

FIELD OF INVENTION

This invention relates to drawbars for agricultural use and more particularly for a method and apparatus for quickly folding and unfolding a drawbar from the narrow transport position to the unfolded operating field position.

BACKGROUND

Farm implements which are adapted to allow the outer wings to fold and trail behind the towing implement for narrow transport width are a widely used form of agricultural drawbar. The most economical form of these drawbars rely on the power source to tow the drawbar forward to fold the wings into transport position and to push the drawbar rearwardly to unfold the wings into the working/operating position.

To fold the wings, the operator must first disable the wing latching mechanisms, usually by means of a mechanical cable attached to a latch. Thereafter, the operator will drive forwardly with the power source, for example a tractor, until the wings trail behind the power source for transporting the implement on roads, highways, or through farm gates.

Proper trailing of the wings in transport position relies on one wheel on each wing being moved into a position parallel to the longitudinal axis of the wing. The same wheel should be perpendicular to the wing or be free to follow in the direction of travel when in the working position. As a result of these constraints, this wheel, typically a castering wheel, must change position as the wings are folded back to the transport position. Problems can arise when the wheel does not rotate into the proper transport locked position as the drawbar is towed or driven forward a short distance.

In order to unfold the wings from the transport trailing position to the operative unfolded working position, the operator must move the drawbar rearwardly until the wings spread out fully into the working position and the wing hitch latches are locked.

The prior art devices and method of inducing the wings to spread is to have the locked caster wheels cambered outwardly or with a positive camber such that their rolling path of least resistance is an arc which causes the wings to spread. Problems frequently arise when the ground surface is uneven or inclined because the natural tendency of the wheels to follow an arc is overpowered by external forces.

It is an object of the present invention to provide a castering wheel arrangement which improves the folding movement of the drawbar to the transport position.

It is a further object of the present invention to provide another castering wheel assembly which improves the speed and shortens the distance required to move the drawbar from the folded transport to the unfolded operating position.

SUMMARY OF THE INVENTION

Therefore, this invention seeks to provide a foldable agricultural drawbar adapted to be pulled by a power source comprising: at least one right wing boom; and at least one left wing boom; each of said wing booms being pivotally attached to a framed cart and detachably connected by a latch mechanism to a wing hitch assembly, and being supported by at least one castering wheel assembly; said castering wheel assembly being fully lockable when its wheel, in operation, is parallel to a longitudinal axis of one of said booms; said assembly including a control arm, said control arm being attached to a control means; said control means being attached at its opposite end to said cart; whereby, in operation, when said latch mechanism is opened, and said drawbar is moved forwardly by said power source, said control means exerts force on said control arm as said wing boom folds rearwardly, thereby rotating said wheel of said castering assembly from a first field operating position wherein said wheel is substantially perpendicular to said wing boom to a second locked transport position wherein said wheel is parallel to said longitudinal axis of said boom; said rotation of said wheel promoting smooth and efficient movement of said boom from a position perpendicular to the line of travel to a trailing position parallel to the line of travel.

This invention further seeks to provide a drawbar including a second castering wheel assembly supporting each wing boom, said second assemblies being semi-lockable and comprising a means of restricting rotation of said assemblies to less than 180 degrees, wherein, in operation, when said drawbar is pulled forwardly in the folded transport position, a wheel of each of said second castering wheel assemblies is free to caster in a trailing position behind its axis of rotation; and when said drawbar is pushed rearwardly a wheel of each of said second assemblies turns inwardly less that 180 degrees about its caster axis until said wheel faces outwardly from the line of travel of said cart; thereby, with additional rearward movement of said drawbar, said wheel guides said wing boom outwardly from the folded transport position to the unfolded operating position.

The present invention is used for drawbars comprising two or more wing booms with at least one or more ground engaging caster wheels supporting each wing boom. In the case of one wheel per wing boom the caster wheel is a locking caster wheel. In the case where two or more caster wheels are used at least one caster wheel, preferably the inner caster wheel, is a locking caster wheel and at least one caster wheel, generally the outer caster wheel, is free to rotate to a certain degree. When in the transport position, the locking caster wheel is locked in the position parallel to the boom in order to produce a narrow transport width. The outer caster wheel on each wing, when present, is generally free to caster when in the transport position. This arrangement allows the unit to be maneuvered in transport without the tires skidding.

When in the field position with the wings extended all caster wheels are generally free to rotate at least 180 degrees.

The present invention includes a means of insuring that one of the caster wheels on each wing, preferably the inner wheel, rotates into a locked position, within a very short distance of forward travel, with the wheel being parallel to the boom. The locking caster wheel is rotated into this position through a tensioning/control mechanism which takes mechanical advantage of the changing position of the wing in relation to the cart, as it moves into the trailing transport position.

The second feature of the present invention includes an outer semi-lockable caster wheel on each wing which is free to rotate through all angles required for forward transport; however, when the operator moves the drawbar rearwardly to place it back in the unfolded working/operating position, the semi-locked caster wheel rotates to a stop to provide for a toe-out position relative to the direction of travel to steer the wings apart.

Positive folding of the wings into the transport trailing position is accomplished through the attachment of a tension member, usually a steel-wire rope connected between the frame of the cart near the wing attachment point, and a control arm of the locking caster wheel on each wing. The wing latches are released and the caster wheel locks are enabled in preparation for folding into the transport position.

When the operator pulls the drawbar forwardly, the unlatched wings will begin to trail back due to rolling friction and mass inertia. As the wings begin to fold the tension member pulls on the locking caster wheel control arm, rotating the wheel towards an enabled lock mechanism which captures and locks the wheels when the wheels are parallel to the wing booms. Meanwhile, the outer caster wheels are free to caster and follow the boom.

Positive unfolding from transport to field position is achieved through the use of a caster rotation restricting device on the semi-lockable caster wheel located at the end of each wing boom. When the folded drawbar is moved rearwardly the semi-locked caster wheels will turn inwardly towards the center of the line of travel to trail behind the respective caster wheel rotational axes. When the caster wheels turn inwardly they contact a stop lock mechanism which limits the rotation to less than 180 degrees. This results in these wheels being directed outwardly away from the center of the line of travel of the power source, in a toe-out position, which steers the wings apart when the drawbar is moved further rearwardly. The lock stop is located in a position which will not restrict the rotation of the caster wheels except when moving the drawbar rearwardly.

In a preferred embodiment the outer semi-lockable caster wheels have a negative camber when the drawbar is drawn forwardly and when the drawbar is pushed rearwardly and the outer semi-lockable wheels rotate inwardly to trail behind their respective axes, they take on a positive camber and are thus cambered outwardly.

It is to be understood that any type of tensioning/control member such as a torque transmitting shaft extending from the cart to the lockable caster wheels could be used as long as the lockable caster wheel is quickly rotated to the locked transport position parallel to the wing booms when moving into the transport position.

BRIEF DESCRIPTION OF THE DRAWINGS

This invention will be described in greater detail in conjunction with the following drawings wherein.

DETAILED DESCRIPTION OF THE INVENTION

Figure 1A:
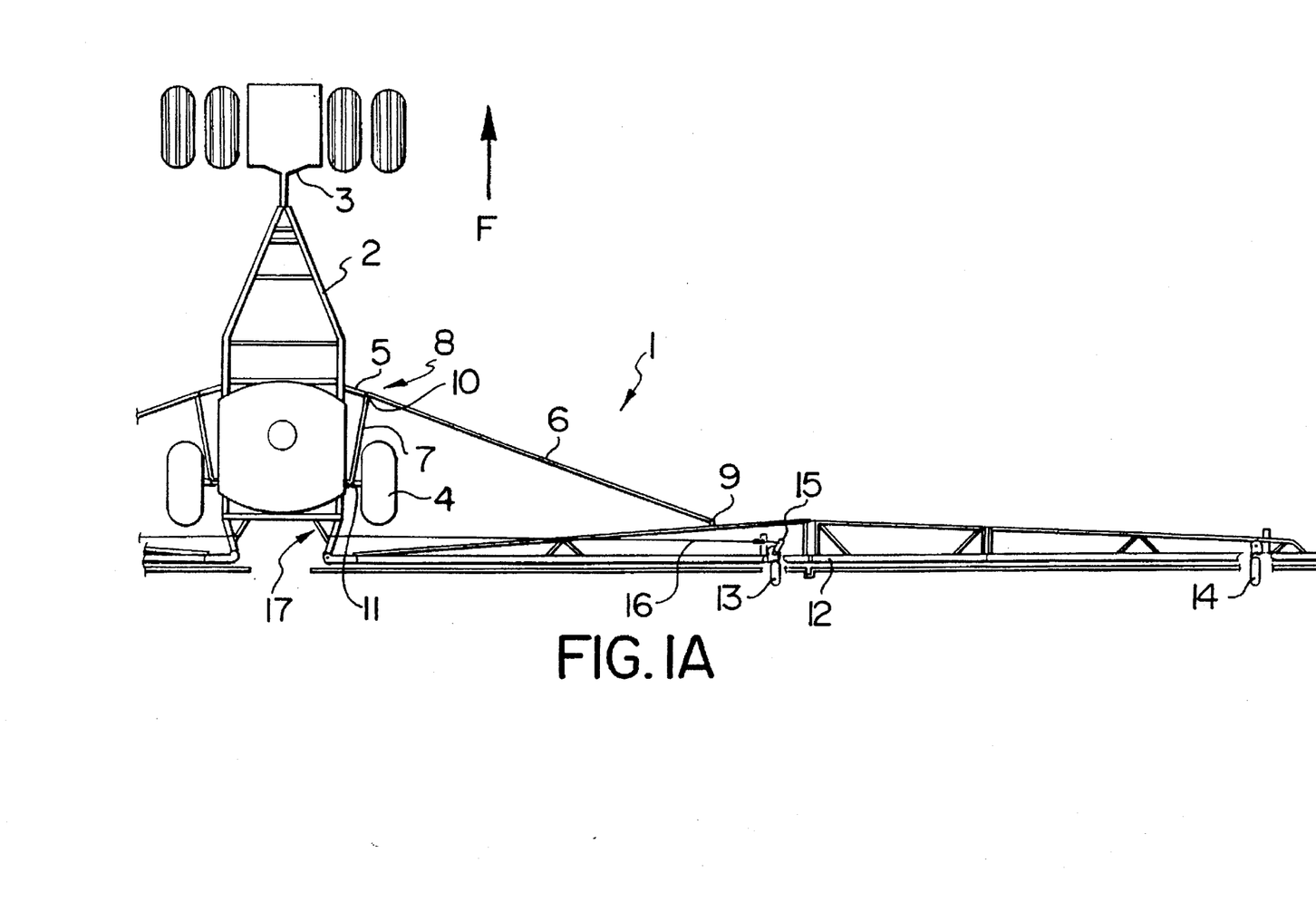
FIG. 1A is a partial top view of the drawbar of the present invention with the right wing boom in the operating position.

In FIG. 1A, the drawbar shown generally as 1, has a framed cart 2 pulled by a tractor 3. The frame cart is supported by wheels 4. Extending outwardly from the frame on either side is the wing hitch 5 which is detachably connected to a wing boom hitch 6. Wing boom hitch 6 is pivotally connected to wing hitch support arm 7 at pivot point 10. Latch mechanism 8 detachably connects the wing boom hitches from the wing hitch. Wing boom hitch 6 is pivotally connected to the wing boom 12 at point 9. The wing hitch support arm 7 is pivotally connected to the frame at pivot point 11.

In FIG. 1A only the right wing boom is shown, however it is to be understood that there is a similar left wing boom which moves in a similar manner. Right wing boom 12 is supported by lockable caster wheel assembly 13 and semi-lockable caster wheel assembly 14. Lockable caster wheel assembly 13 has a control arm shown as 15 which is fixedly connected by means of a tensioning/control means 16 attached to the frame of the cart at point 17.

As shown in FIG. 1A, the drawbar wing boom 12 is the operating position with its longitudinal axis perpendicular to the direction of travel which is shown with an arrow, marked as F. In this position wing hitch 5 is connected to wing hitch boom 6 by wing hitch latch 8.

Figure 1B:
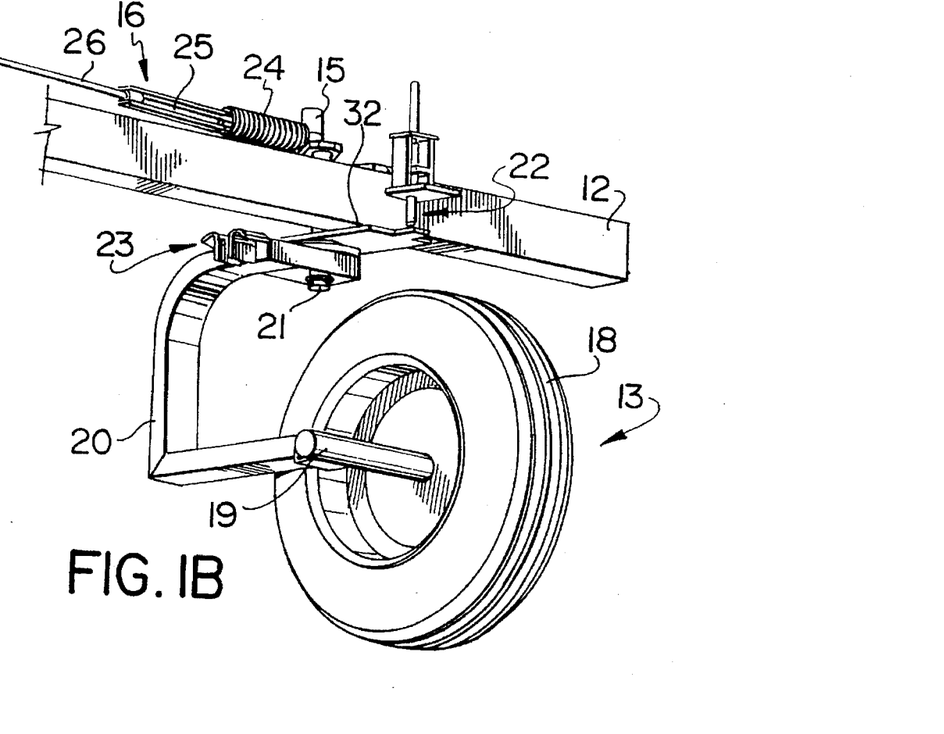
FIG. 1B is an expanded partial perspective view of the right wing boom inner lockable caster wheel assembly in the non-locked working/operating position.

In FIG. 1B a detailed perspective view of lockable caster assembly 13 is shown. The lockable caster wheel assembly 13 is in the unlocked working or operating position, as shown in FIG. 1A.

Caster wheel assembly 13 has a wheel 18 rotatable about an axle 19 which is attached to a caster bracket 20. Caster bracket 20 rotates about caster axis pin 21. Caster assembly 13 is fixedly mounted on wing boom 12 by means of a bracket 32. It is to be noted that caster assembly 13 is equipped with a retractable lock pin 22 shown in the retracted position in FIG. 1B. Lock pin 22 is adapted to be fixed in lock stops 23 in the transport locked position. Lock pin 22 can be retracted or permitted to extend into the locked position by a mechanically moved attachment means which is well known in the art (not shown). Control arm 15 is fixedly attached to safety spring 24 which in turn is attached to adjustment bracket 25 and tension means 26, which in a preferred embodiment is a wire rope or cable.

Figure 2A:
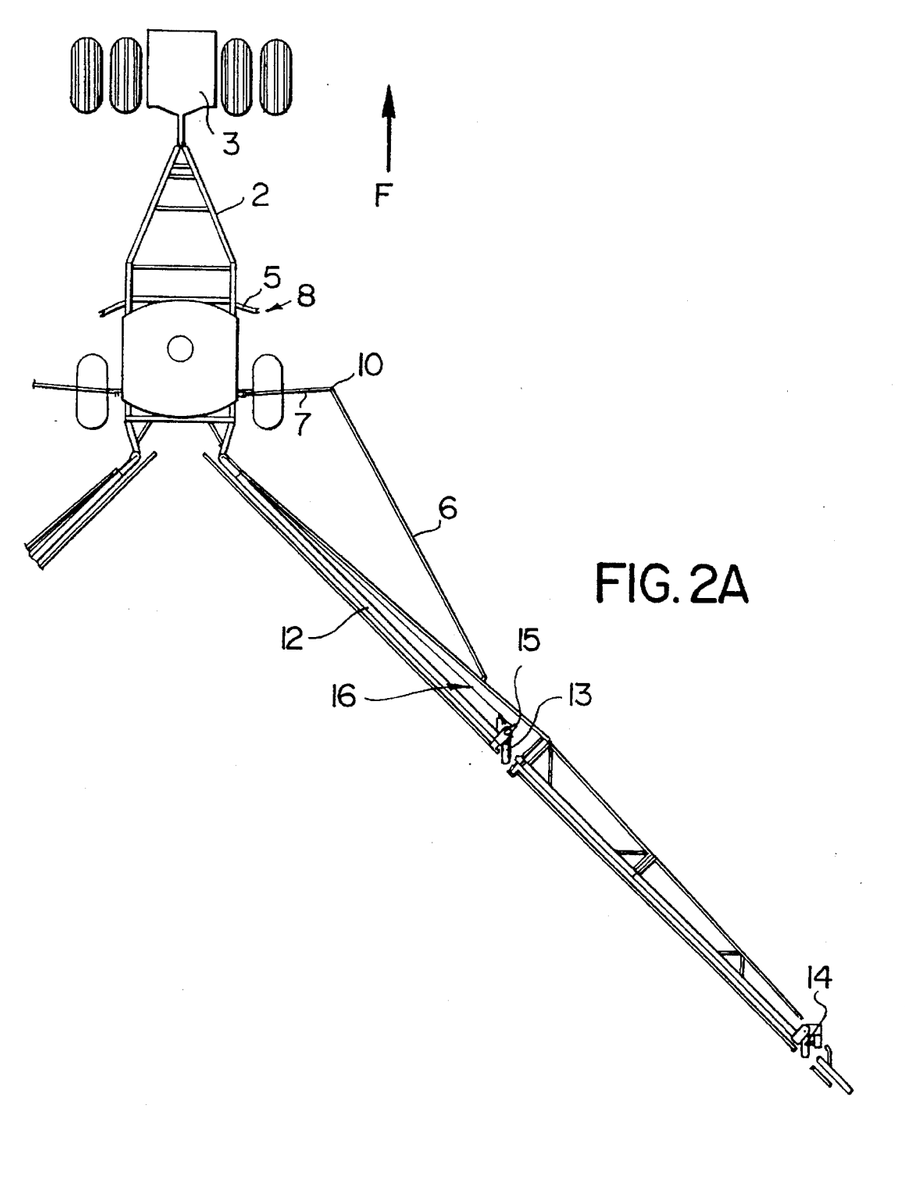
FIG. 2A is a top view of the drawbar of the present invention with the right wing boom in a partially folded position.

In FIG. 2A right wing boom 12 has moved to a half-folded position. This is accomplished by the operator detaching wing hitch latch 8. This permits wing boom hitch 6 and support arm 7 to move away from the cart 2 as the tractor is being driven in the forward direction. As the wing boom 12 begins to rotate inwardly and rearwardly tensioning/control means 16 pulls on control arm 15 of inner lockable caster wheel assembly 13 causing the wheel to rotate. This permits wing boom 12 to move quickly into transparent position behind the cart. In addition, one notes that semi-lockable caster wheel 14 trails in a free castering motion behind wing boom 12 as it rotates inwardly and rearwardly towards the rear center of the cart.

Figure 2B:
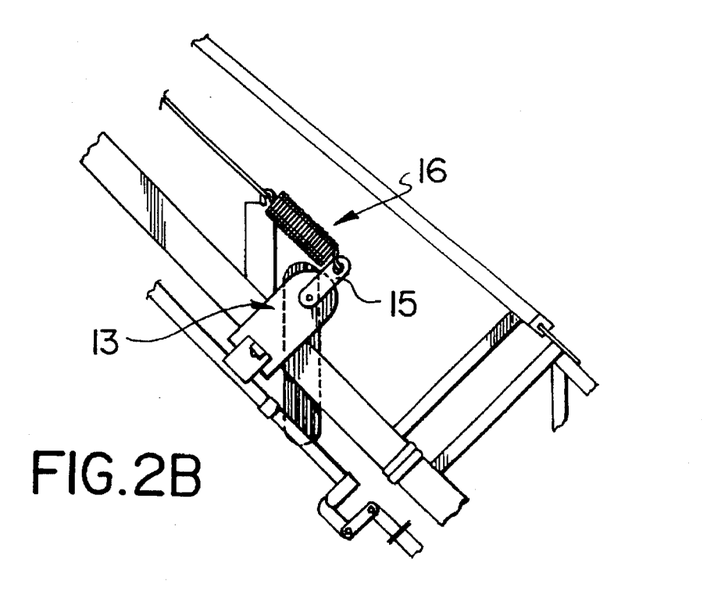
FIG. 2B is a plan view of the lockable caster wheel assembly with the right wing in the partially folded position.

FIG. 2B is an expanded view of lockable inner castering wheel 13 when the right wing boom 12 is in the half-folded position.

Figure 3A:
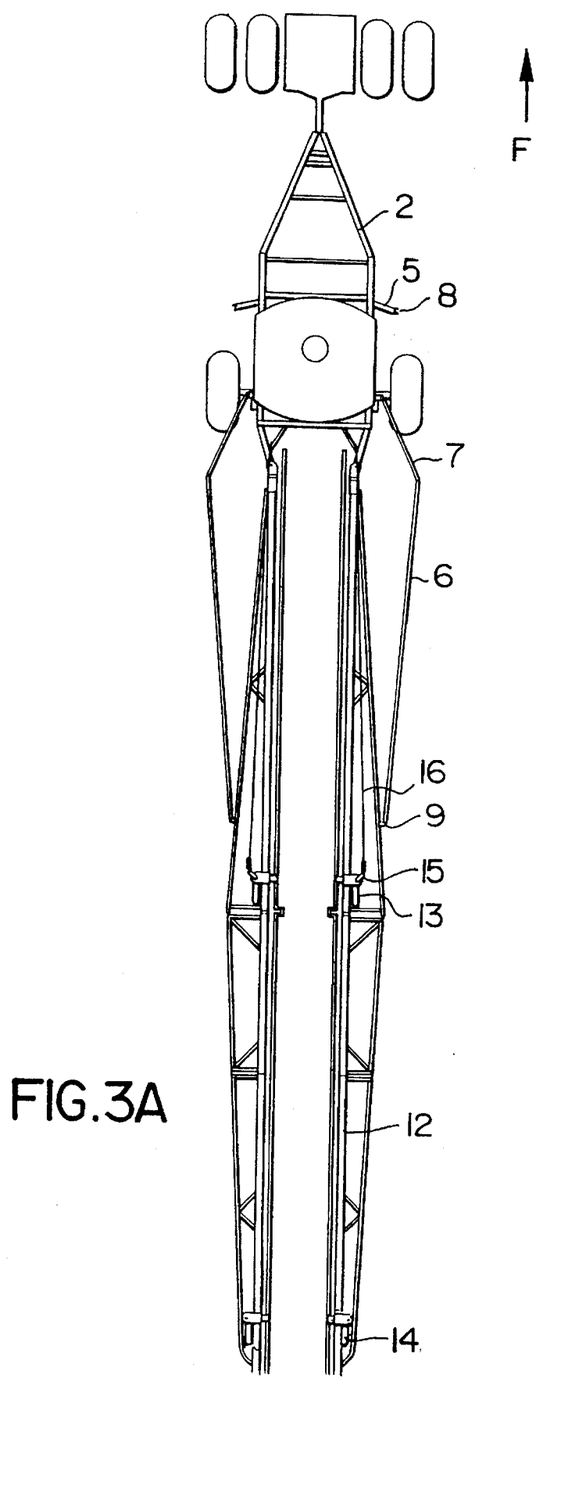
FIG. 3A is a top view of the drawbar of the present invention with the right and left wing booms in the transport position.

In FIG. 3A, the right and left wing booms have moved to the full folded transport position. Inner lockable caster wheel 13 is parallel to wing boom 12 and is now in a locked position ready for transport. Semi-lockable outer castering wheels 14 follow behind the caster axes in a free castering mode as the implement is pulled forward in transport position. The direction of travel is shown by an arrow and marked as F.

Figure 3B:
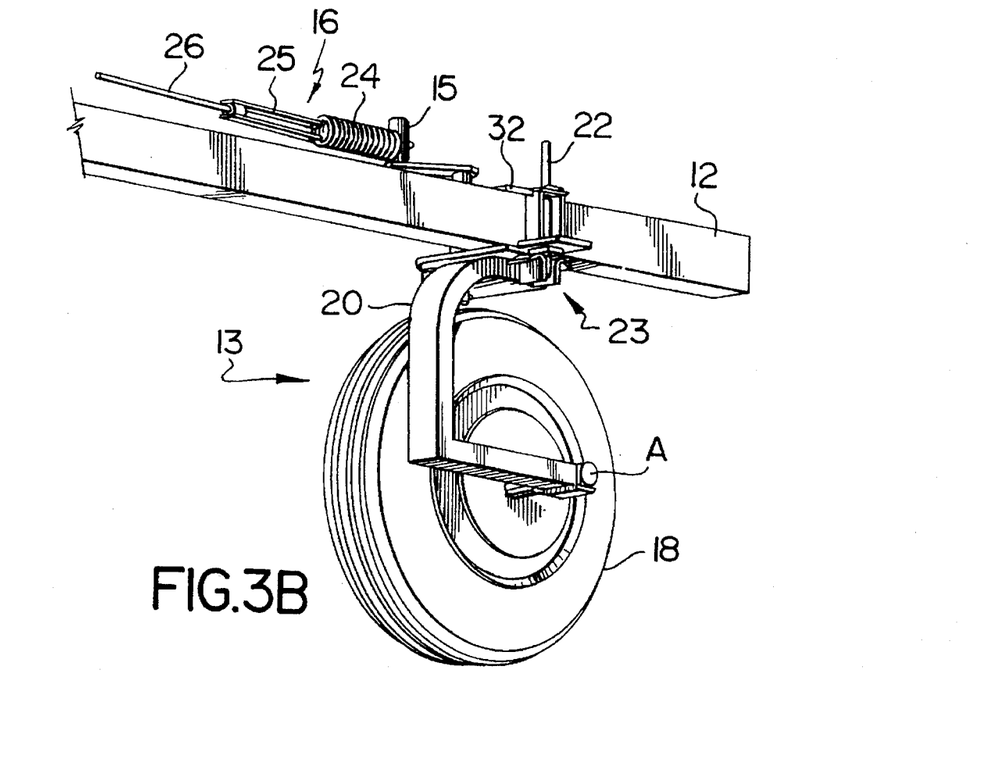
FIG. 3B is a perspective view of the right wing boom lockable caster wheel in the locked transport position.

FIG. 3B is a perspective expanded detailed view of lockable castering wheel 13 in the locked position with pin 22 locked securely between lock stops 23. The retraction and release means for pin 22 is not shown but it is well known in the art. In FIG. 3B wheel 18 is parallel to the longitudinal axis of wing boom 12, and control arm 15 has been moved to the forward most position relative to the power source.

Figure 3C:
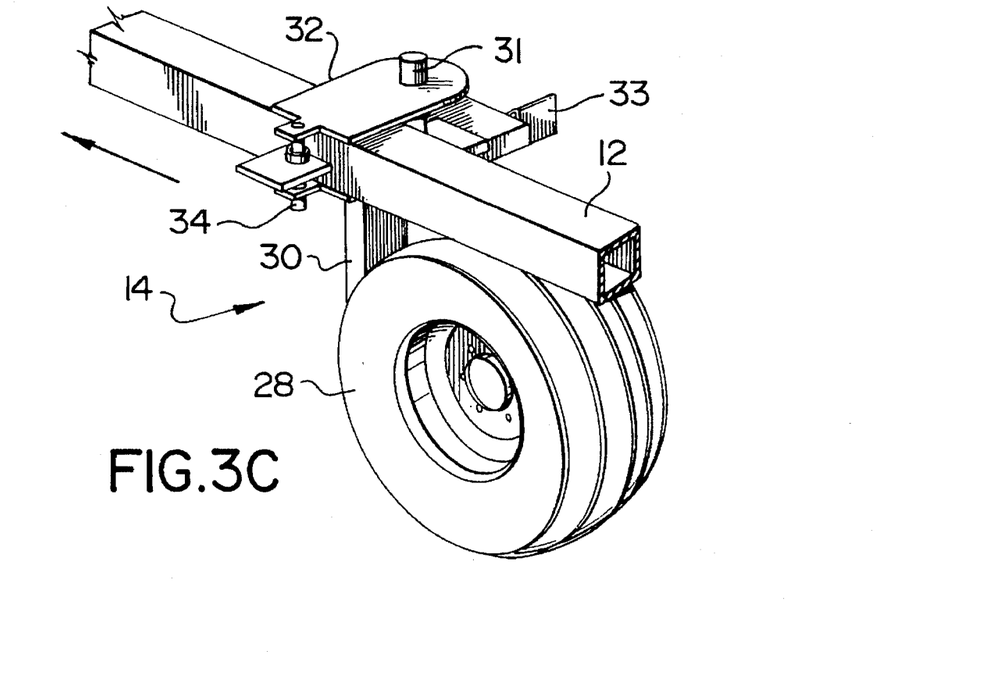
FIG. 3C is a perspective view of the semi-lockable outer caster wheel in the transport position.

In FIG. 3C, semi-lockable outer caster wheel 14 is shown in greater detail. In FIG. 3C, caster wheel assembly 14. is in the position shown in FIG. 3A, namely in a trailing position. The direction of travel of the drawbar in the transport position is shown by an arrow. In this position, semi-lockable caster wheel 14 is free to caster in transport position. The wheel 28 is substantially parallel to the longitudinal axis of wing boom 12 and is castering behind caster axis 31. Outer caster wheel assembly 14 is secured to the boom 12 by means of bracket 32. Caster wheel assembly 14 also has a lock stop 33 adapted to abut a lock pin 34 as will be more clearly described in conjunction with FIG. 4C.

Figure 3D:
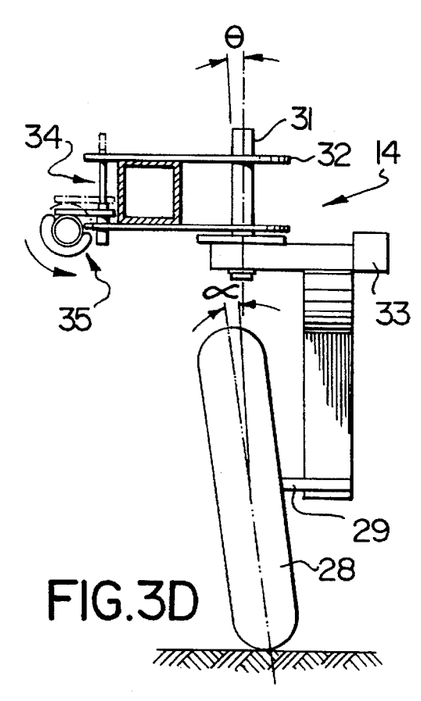
FIG. 3D is a rear view of the right wing boom semi-lockable outer caster wheel in the transport position.

In FIG. 3D, one views outer semi-lockable caster wheel assembly 14 from the rear, in the transport forward moving mode. To encourage the semi-lockable caster wheel to rotate inwards, the camber angle of the semi-lockable caster wheel can be moved off the vertical. Thus, in this preferred embodiment, the outer semi-lockable caster wheels are cambered inward or have a negative camber. Thus, in the transport forward, moving position, the rear or outer semi-lockable caster assemblies have the ground engaging portions of the wheels further apart from each other than the top portion of the wheels.

Figure 3E:
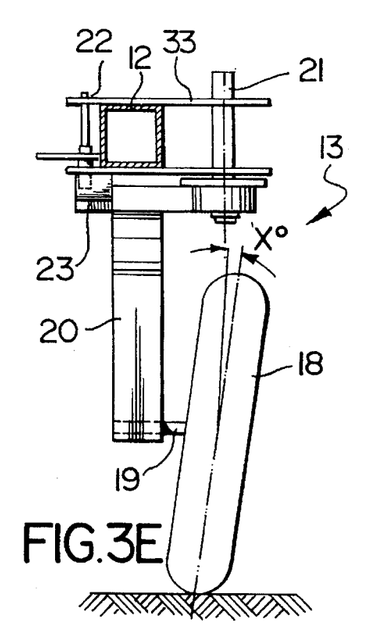
FIG. 3E is a rear view of the right wing boom locking inner caster wheel in the locked transport position.

In FIG. 3E, inner lockable caster assembly 13 is viewed from the rear when in the transport position. In this case, as was shown in FIG. 3B, caster wheel assembly 13 is in the locked position with locking pin 22 secured between lock stops 23. In this preferred embodiment wheel 18 is cambered outwardly, that is to say it has a positive camber. This can be accomplished by inclining axle 19 relative to caster bracket 20.

Figure 4A:
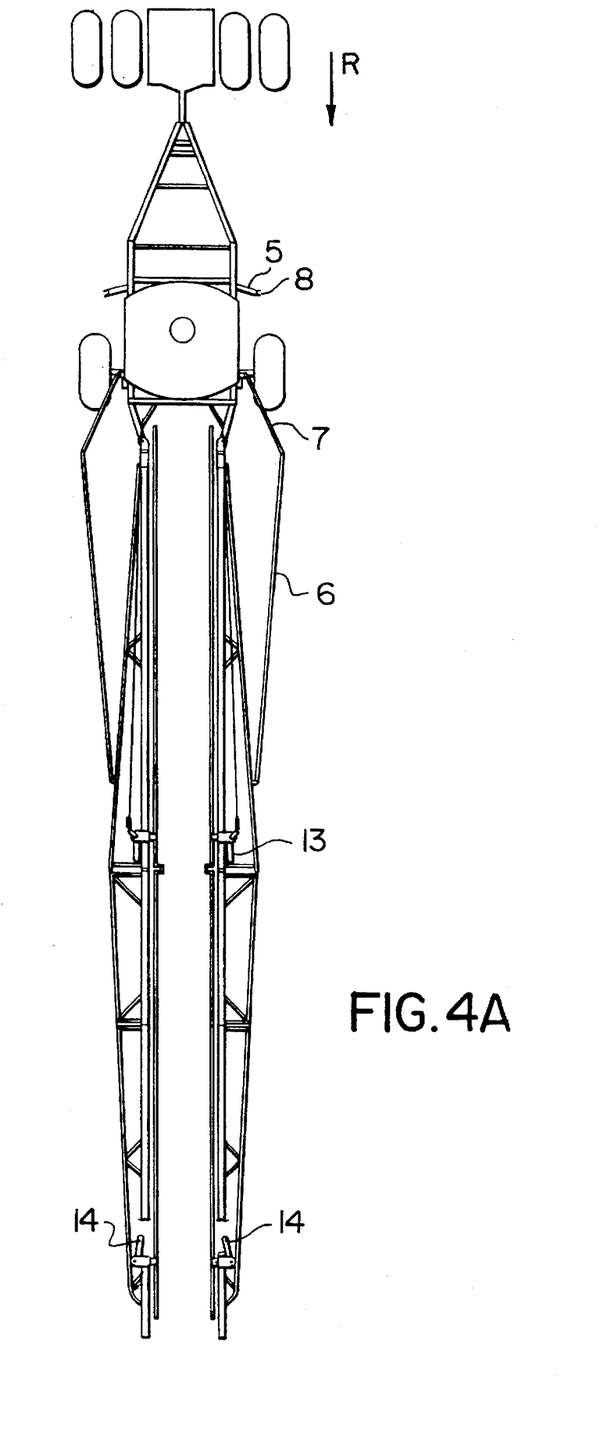
FIG. 4A is a top view of the drawbar of the present invention as viewed just after the drawbar commences its rearward movement towards the unfolded operating position.

When the operator wishes to place the drawbar back into the operating position, the tractor is placed in reverse and the drawbar is moved in the direction of travel, as shown in FIG. 4A by an arrow and marked R.

Figure 4B:
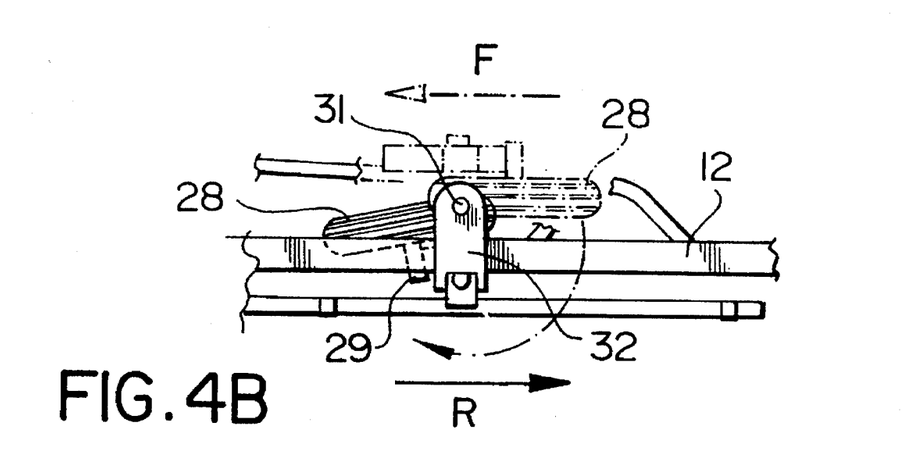
FIG. 4B is an enlarged fragmentary plan view showing the rotation of the right wing boom semi-lockable caster wheel during the unfolding process.

As shown in FIG. 4B, rearward movement of the drawbar in the transport position, causes wheel 28 of caster wheel assembly 14 to turn inwardly. This is due to the negative camber of the wheel shown in FIG. 3D. Thus, after the drawbar has been moved slightly rearwardly, the outer caster wheels 28 have rotated inwardly and trail about caster axes 31. Thus, both outer caster wheels 28 are in the position shown in FIG. 4A.

Figure 4C:
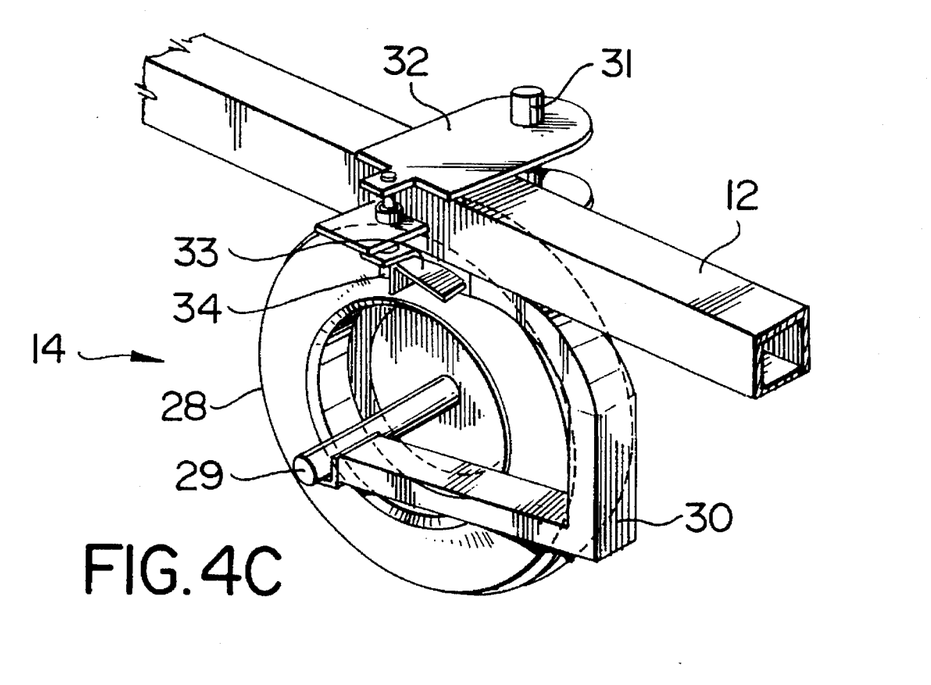
FIG. 4C is a partial perspective view of the right wing boom in semi-lockable caster wheel during the unfolding process.

The position of the right wing boom outer caster wheel assembly 14, after this rearward movement of the boom 12, is also shown in FIG. 4C. Lock stop 33 has turned around and is abutting lock pin 34. However, as shown from the top view in FIGS. 4A and 4B, the wheel 28 has not turned 180 degrees but rather somewhat less than that. In a preferred embodiment the angle of rotation is somewhere between 160 and 170 degrees. In this position outer caster wheels 28 are in a "toe-out" position relative to the direction of travel and also have a positive camber similar to that of lockable inner caster wheel assembly wheels 18.

In operation, as the drawbar is moved rearwardly, the toe-out position of wheels 28 of caster wheel assemblies 14 tends to spread the wings quickly towards the operating position. Meanwhile it is to be noted that lockable caster wheel assemblies 13 remain in the locked position having the wheels parallel to the longitudinal axes of the booms.

Figure 5A:
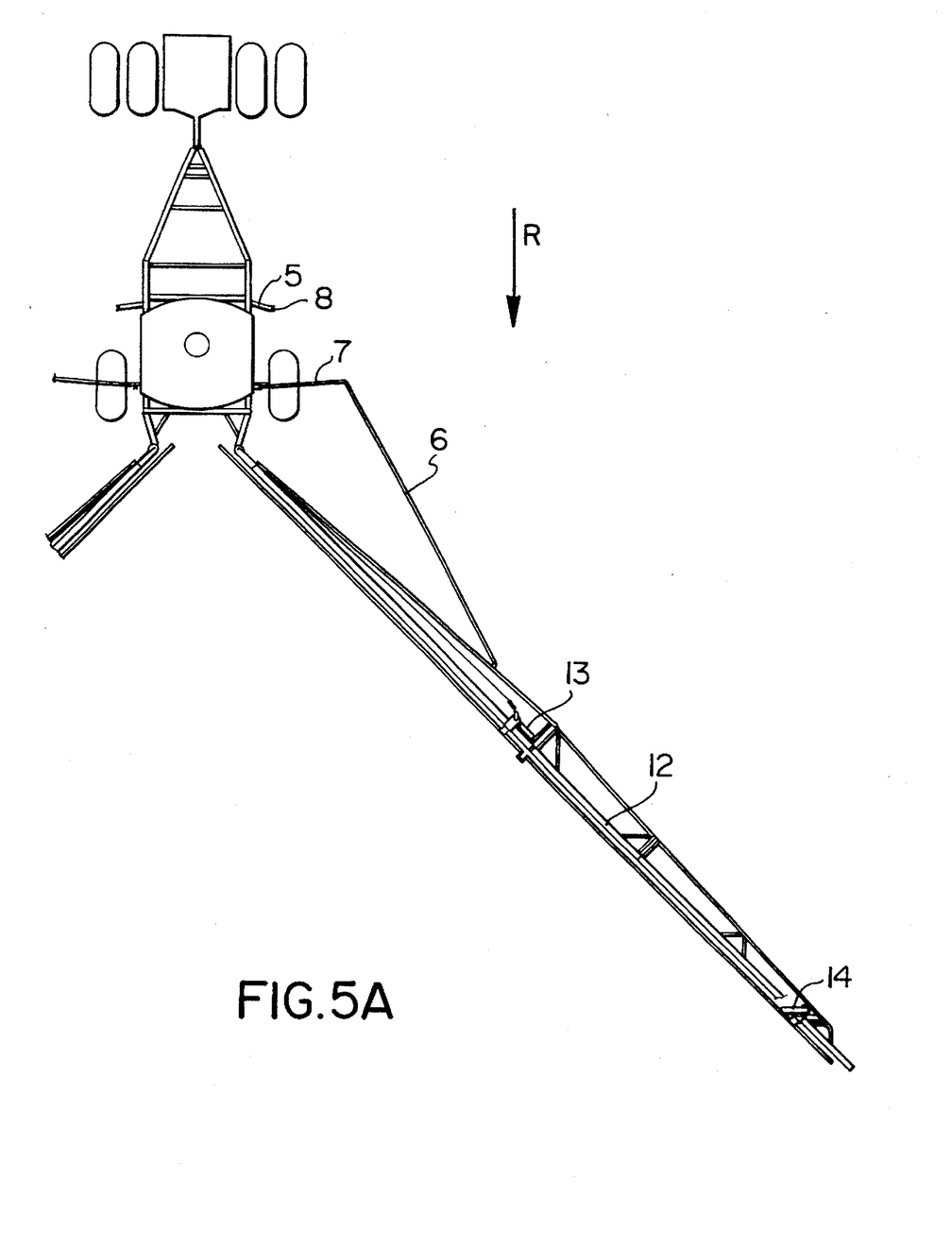
FIG. 5A is a partial top view of the drawbar halfway through the unfolding process.

In FIG. 5A right wing boom 12 (the left wing boom is not shown) has moved to the half-unfolded position. At approximately that point outer camber wheel assembly begins to camber freely and lock stop 33 no longer abuts pin 34. However, the lockable caster wheel assemblies 13 remain in the locked position with the wheel parallel to the longitudinal axis of wing boom 12.

Figure 6A:
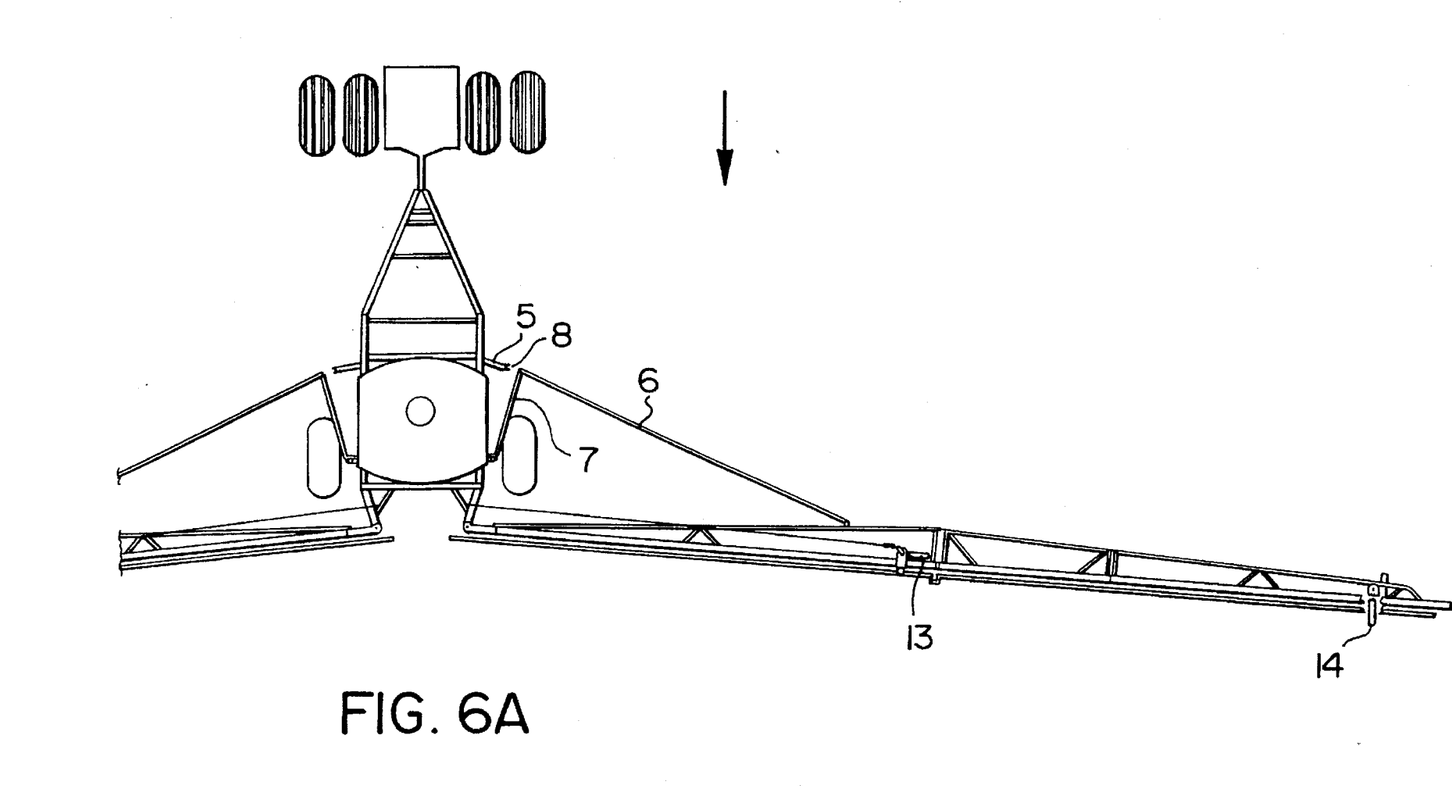
FIG. 6A is a top view of the right wing boom of the drawbar taken just prior to reaching the operating position.

In FIG. 6A the drawbar has moved almost to the operating position, outer caster wheel assembly 14 is castering freely while lockable caster wheel 13 remains in the locked position. Once wing boom hitch 6 and wing hitch support arm 7 are connected to wing hitch 5 by means of latch 8, the drawbar is in an operating position. However, prior to moving the implement forwardly for harrowing, spraying or some other purpose, the driver by means of a mechanical link must retract lock pin 22 from lock stops 23 of caster wheel assembly 13 and upon forward movement caster wheel assembly 13 will take on a similar free cambering position as that shown in FIG. 1A.

In summary, as can be seen by the aforementioned drawings, the folding to transport position and unfolding back to operating position through the sequence of drawings, illustrates the improved movement accomplished by the tensioned lockable caster wheel assembly 13 and the toe-out of the semi-lockable caster wheel assemblies 14 during the folding and unfolding processes, respectively.

It is to be understood that although a preferred embodiment of the invention has been shown, this invention is intended to encompass any toe-out of the outer caster wheels or any tensioning/control means applied to the inner castering wheel assemblies.

What we claim as our invention is:

1. A rearwardly automatically foldable agricultural drawbar adapted to be pulled by a power source comprising:

at least one right wing boom and at least one left wing boom;

each of said wing booms being pivotally attached to a framed cart and detachably connected by a latch mechanism to a wing hitch assembly;

said latch mechanism being activated by an operator at said power source each of said wing booms being supported by a first castering wheel assembly;

said first castering wheel assembly being fully and automatically lockable when its wheel, in operation, is parallel to a longitudinal axis of its respective supported wing boom;

said first castering wheel assembly including a control arm, said control arm being fixedly mounted to said first castering wheel assembly such that in operation, movement of a remote end of said control arm in a horizontal plane causes a proportional rotation of said wheel of said first castering wheel assembly;

said control arm being attached to a tensioning means, said tensioning means being attached at its opposite end to said cart;

whereby, in operation, when said latch mechanism is opened, and said drawbar is moved forwardly by said power source, said tensioning means exerts force on said control arm thereby causing a remote end of said control arm to move through an arc in a horizontal plane as said wing boom folds rearwardly, thereby rotating said wheel of said castering wheel assembly from a first field operating position wherein said wheel is substantially perpendicular to said wing boom to a second locked transport position wherein said wheel is parallel to said longitudinal axis of said wing boom;

said rotation of said wheel promoting smooth and efficient movement of said wing from a position perpendicular to the line of travel to a trailing position parallel to the line of travel.

2. A drawbar as claimed in claims 1 wherein each of said first castering wheel assemblies, when viewed from the rear in the transport position, has a wheel with a positive camber such that ground engaging portions of said wheels of said first castering wheel assemblies supporting said right and left wing booms are closer together than the tops of said wheels, whereby, in operation, said wheel with a positive camber promotes rapid unfolding of said drawbar from the transport to operating position when said drawbar is pushed rearwardly.

3. A drawbar as claimed in claim 2 wherein said cambering of said wheels is created by inclining axles of said wheels off the horizontal.

4. A drawbar as claimed in claim 1 or claim 2, wherein said tensioning means comprises:
a spring;
an adjustment bracket;
a cable; and
said cable being attached at a forward end to said cart, and at a rearward end to said adjustment bracket; said adjustment bracket being attached to said spring; and said spring being attached to said control arm.

5. A rearwardly automatically foldable agricultural drawbar adapted to be pulled by a power source comprising:
at least one right wing boom
and at least one left wing boom;
each of said wing booms being pivotally attached to a framed cart and detachably connected by a latch mechanism to a wing hitch assembly;
said latch mechanism being activated by an operator at said power source;
each of said wing booms being supported by a first castering wheel assembly;
said first castering wheel assembly being fully and automatically lockable when its wheel, in operation, is parallel to a longitudinal axis of its respective supported wing boom;
said first castering wheel assembly including a control arm, said control arm being fixedly mounted to said castering wheel assembly such that, in operation, movement of a remote end of said control arm in a horizontal plane causes a proportional rotation of said wheel of said first castering wheel assembly;

said control arm being attached to a tensioning means;

said tensioning means being attached at its opposite end to said cart;

said drawbar further including a second castering wheel assembly supporting each wing boom, said second castering wheel assemblies being semi-lockable and comprising a means of restricting rotation of said castering wheel assemblies to less than 180 degrees;

wherein, in operation, during forward movement of said drawbar in the transport position, said wheels of said second castering wheel assemblies have a negative camber thereby urging said second castering wheel assemblies to rotate inwardly about their respective castering axes to a toe-out position when said drawbar is moved rearwardly, thereby promoting unfolding of said wing booms from a folded transport position to an unfolded operating field position.

6. A drawbar as claimed in claim 5 wherein, when said drawbar is moved rearwardly, said second castering wheel assemblies are urged to rotate inwardly by inclining the castering axes of said second castering wheel assemblies away from the vertical.

7. A rearwardly automatically foldable agricultural drawbar adapted to be pulled by a power source comprising:
at least one right wing boom
and at least one left wing boom;
each of said wing booms being pivotally attached to a framed cart and detachably connected by a latch mechanism to a wing hitch assembly;
said latch mechanism being activated by an operator at said power source;
each of said wing booms being supported by a first castering wheel assembly;
said first castering wheel assembly being fully and automatically lockable when its wheel, in operation, is parallel to a longitudinal axis of its respective supported wing boom;
said first castering wheel assembly including a control arm, said control arm being fixedly mounted to said castering wheel assembly such that in operation, movement of a remote end of said control arm in a horizontal plane causes a proportional rotation of said wheel of said first castering wheel assembly;

said control arm being attached to a tensioning means;

said tensioning means being attached at its opposite end to said cart;

said drawbar further including a second castering wheel assembly supporting each wing boom, said second castering wheel assemblies being semi-lockable and comprising a means of restricting rotation of said second castering wheel assemblies to less than 180 degrees;

wherein, in operation, when said drawbar is pulled forwardly in the folded transport position, a wheel of each of said second castering wheel assemblies is free to caster in a trailing position behind its axis of rotation;

and when said drawbar is pushed rearwardly a wheel of each of said second castering wheel assemblies rotates inwardly less than 180 degrees about its castering axis until said wheel faces outwardly from the line of travel of said cart; whereby, with additional rearward movement of said drawbar, said wheel guides said wing boom outwardly from a folded transport position to an unfolded operating position.

8. A rearwardly automatically foldable agricultural drawbar adapted to be pulled by a power source comprising:

at least one right wing boom and at least one left wing boom;

each of said wing booms being pivotally attached to a framed cart and detachably connected by a latch mechanism to a wing hitch assembly;

said latch mechanism being activated by an operator at said power source;

each of said wing booms being supported by a first castering wheel assembly;

said first castering wheel assembly being fully and automatically lockable when its wheel, in operation, is parallel to a longitudinal axis of its respective supported wing boom;

said first castering wheel assembly including a control arm, said control arm being fixedly mounted to said castering wheel assembly such that, in operation, movement of a remote end of said control arm in a horizontal plane causes a proportional rotation of said wheel of said first castering wheel assembly;

said control arm being attached to a tensioning means;

said tensioning means being attached at its opposite end to said cart;

said drawbar further including a second castering wheel assembly supporting each wing boom, said second caster assemblies being semi-lockable and comprising a means of restricting rotation of said second castering wheel assemblies, wherein wheels of said second castering wheel assemblies are permitted to rotate inwardly about a castering axis between 150 and 177 degrees when said drawbar, in operation, is pushed rearwardly.

9. A rearwardly automatically foldable agricultural drawbar adapted to be pulled by a power source comprising:

at least one right wing boom and at least one left wing boom;

each of said wing booms being pivotally attached to a framed cart and detachably connected by a latch mechanism to a wing hitch assembly;

said latch mechanism being activated by an operator at said power source;

each of said wing booms being supported by a first castering wheel assembly;

said first castering wheel assembly being fully and automatically lockable when its wheel, in operation, is parallel to a longitudinal axis of its respective supported wing boom;

said first castering wheel assembly including a control arm, said control arm being fixedly mounted to said castering wheel assembly such that, in operation, movement of a remote end of said control arm in a horizontal plane causes a proportional rotation of said wheel of said first castering wheel assembly;

said control arm being attached to a tensioning means;

said tensioning means being attached at its opposite end to said cart;

said drawbar further including a second castering wheel assembly supporting each wing boom, said second castering wheel assemblies being semi-lockable and comprising a means of restricting rotation of said castering wheel assemblies to less than 180 degrees; and wherein said first castering wheel assemblies are located closer to the cart than said second castering wheel assemblies.

10. A rearwardly automatically foldable agricultural drawbar adapted to be pulled by a power source comprising:

at least one right wing boom and at least one left wing boom;

each of said wing booms being pivotally attached to a framed cart and detachably connected by a latch mechanism to a wing hitch assembly;

said latch mechanism being activated by an operator at said power source;

each of said wing booms being supported by a first castering wheel assembly;

said first castering wheel assembly being fully and automatically lockable when its wheel, in operation, is parallel to a longitudinal axis of its respective supported wing boom;

said first castering wheel assembly including a control arm, said control arm being fixedly mounted to said castering wheel assembly such that, in operation, movement of a remote end of said control arm in a horizontal plane causes a proportional rotation of said wheel of said first castering wheel assembly;

said control arm being attached to a tensioning means;

said tensioning means being attached at its opposite end to said cart;

said drawbar further including a second castering wheel assembly supporting each wing boom, said second castering wheel assemblies being semi-lockable and comprising a means of restricting rotation of said castering wheel assemblies to less than 180 degrees;

said means of restricting rotation of said second castering wheel assemblies comprising a stop block, a lock pin, and a cam;

said stop block being fixedly attached to a frame of said second castering wheel assembly, and said lock pin and cam being mounted on a bracket which fixedly attaches said second castering wheel assemblies to respective wing booms; and whereupon, in operation, when said drawbar moves forwardly in a transport or operating position, said stop block is remote from said lock pin and cam, and when said drawbar moves rearwardly said stop block abuts said lock pin thereby placing a wheel of said second castering wheel assembly in a toe-out positive camber position.

* * * * *